United States Patent
Forte

(10) Patent No.: US 7,274,782 B2
(45) Date of Patent: *Sep. 25, 2007

(54) METHOD AND APPARATUS FOR SELECTIVELY ESTABLISHING COMMUNICATION WITH ONE OF PLURAL DEVICES ASSOCIATED WITH A SINGLE TELEPHONE NUMBER

(75) Inventor: Stephen P. Forte, West Hills, CA (US)

(73) Assignee: Ascendent Telecommunications, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/604,740

(22) Filed: Nov. 28, 2006

(65) Prior Publication Data

US 2007/0127680 A1 Jun. 7, 2007

Related U.S. Application Data

(63) Continuation of application No. 09/593,541, filed on Jun. 14, 2000, now Pat. No. 7,162,020.

(60) Provisional application No. 60/139,498, filed on Jun. 14, 1999, provisional application No. 60/185,070, filed on Feb. 25, 2000.

(51) Int. Cl.
*H04M 3/42* (2006.01)
*H04M 3/46* (2006.01)
*H04M 7/00* (2006.01)
*H04Q 7/24* (2006.01)
*H04Q 7/26* (2006.01)

(52) U.S. Cl. ............................ 379/201.01; 379/201.02; 379/207.02; 379/211.03; 379/211.04; 379/219; 379/231; 455/414.1; 455/445; 455/461; 455/462; 455/554.1; 455/555

(58) Field of Classification Search ........... 379/201.01, 379/201.02, 201.12, 207.02, 211.02, 211.03, 379/211.04, 219, 220.01, 221.01, 231, 232; 455/414.1, 445, 461, 462, 463, 554.1, 555, 455/560

See application file for complete search history.

(56) References Cited

U.S. PATENT DOCUMENTS 4,481,382 A 11/1984 Villa-Real (Continued)

FOREIGN PATENT DOCUMENTS

EP 0836315 A2 4/1998

(Continued)

*Primary Examiner*—Harry S. Hong
(74) *Attorney, Agent, or Firm*—Dickstein Shapiro LLP

(57) ABSTRACT

A system for (and a method of) selectively establishing communication with one of plural devices associated with a single telephone number is provided. In a preferred embodiment, the system includes a wireless connect unit connected between an enterprise private branch exchange (PBX) network and a public switched telephone network. The wireless connect unit preferably serves as a gateway between the PBX and one or more remote communication devices. The remote devices can be used as standard PBX office telephones for both inbound and outbound telephone calls. Thus, features of the PBX network (e.g., voice mail, direct extension dialing, corporate calling plan, etc.) are available to the remote device even though they are not physically connected to the PBX. When the system receives an incoming call, it can route the call to an office telephone and one or more of the remote devices simultaneously or as desired by the user.

19 Claims, 5 Drawing Sheets

U.S. PATENT DOCUMENTS

| | | |
|---|---|---|
| 4,661,970 A | 4/1987 | Akaiwa |
| 4,661,974 A | 4/1987 | Bales et al. |
| 4,674,115 A | 6/1987 | Kaleita et al. |
| 4,829,554 A | 5/1989 | Barnes et al. |
| 4,829,560 A | 5/1989 | Evanyk et al. |
| 4,879,740 A | 11/1989 | Nagashima et al. |
| 4,922,517 A | 5/1990 | West, Jr. et al. |
| 4,942,599 A | 7/1990 | Gordon et al. |
| 4,955,050 A | 9/1990 | Yamauchi |
| 4,964,154 A | 10/1990 | Shimotono |
| 4,972,457 A | 11/1990 | O'Sullivan |
| 5,003,595 A | 3/1991 | Collins et al. |
| 5,054,051 A | 10/1991 | Hoff |
| 5,109,400 A | 4/1992 | Patsiokas et al. |
| 5,117,450 A | 5/1992 | Joglekar et al. |
| 5,134,645 A | 7/1992 | Berken et al. |
| 5,189,525 A | 2/1993 | Kotani |
| 5,197,092 A | 3/1993 | Bamburak |
| 5,218,628 A | 6/1993 | Ito |
| 5,222,123 A | 6/1993 | Brown et al. |
| 5,224,146 A | 6/1993 | Tanaka et al. |
| 5,227,893 A | 7/1993 | Ett |
| 5,239,571 A | 8/1993 | Takahashi |
| 5,243,645 A | 9/1993 | Bissell et al. |
| 5,251,248 A | 10/1993 | Tokunaga et al. |
| 5,291,302 A | 3/1994 | Gordon et al. |
| 5,297,191 A | 3/1994 | Gerszberg |
| 5,297,192 A | 3/1994 | Gerszberg |
| 5,321,737 A | 6/1994 | Patsiokas |
| 5,323,450 A | 6/1994 | Goldhagen et al. |
| 5,353,331 A | 10/1994 | Emery et al. |
| 5,384,825 A | 1/1995 | Dillard et al. |
| 5,406,616 A | 4/1995 | Bjorndahl |
| 5,418,837 A | 5/1995 | Johansson et al. |
| 5,438,608 A | 8/1995 | Kojima |
| 5,448,378 A | 9/1995 | Matsumoto |
| 5,452,347 A | 9/1995 | Iglehart et al. |
| 5,454,032 A | 9/1995 | Pinard et al. |
| 5,469,496 A | 11/1995 | Emery et al. |
| 5,479,483 A | 12/1995 | Furuya et al. |
| 5,481,382 A | 1/1996 | Takahashi et al. |
| 5,481,605 A | 1/1996 | Sakurai et al. |
| 5,483,531 A | 1/1996 | Jouin et al. |
| 5,487,099 A | 1/1996 | Maekawa |
| 5,493,609 A | 2/1996 | Winseck, Jr. et al. |
| 5,495,485 A | 2/1996 | Hughes-Hartogs |
| 5,506,887 A | 4/1996 | Emery et al. |
| 5,507,033 A | 4/1996 | Dolan |
| 5,515,422 A | 5/1996 | MeLampy et al. |
| 5,521,719 A | 5/1996 | Yamada |
| 5,524,045 A | 6/1996 | Yazawa |
| 5,524,146 A | 6/1996 | Morrisey et al. |
| 5,526,403 A | 6/1996 | Tam |
| 5,537,467 A | 7/1996 | Cheng et al. |
| 5,537,610 A | 7/1996 | Mauger et al. |
| 5,541,925 A | 7/1996 | Pittenger et al. |
| 5,548,636 A | 8/1996 | Bannister et al. |
| 5,550,904 A | 8/1996 | Andruska et al. |
| 5,568,489 A | 10/1996 | Yien et al. |
| 5,579,375 A | 11/1996 | Ginter |
| 5,594,777 A | 1/1997 | Makkonen et al. |
| 5,606,604 A | 2/1997 | Rosenblatt et al. |
| 5,608,786 A | 3/1997 | Gordon |
| 5,621,539 A | 4/1997 | Brown et al. |
| 5,631,745 A | 5/1997 | Wong et al. |
| 5,661,785 A | 8/1997 | Carpenter et al. |
| 5,673,118 A | 9/1997 | Kondo et al. |
| 5,689,547 A | 11/1997 | Molne |
| 5,689,825 A | 11/1997 | Averbuch et al. |
| 5,715,301 A | 2/1998 | Terasaki et al. |
| 5,719,922 A | 2/1998 | Bremer et al. |
| 5,722,076 A | 2/1998 | Sakabe et al. |
| 5,724,656 A | 3/1998 | Vo et al. |
| 5,732,074 A | 3/1998 | Spaur et al. |
| 5,737,701 A | 4/1998 | Rosenthal et al. |
| 5,742,905 A | 4/1998 | Pepe et al. |
| 5,757,902 A | 5/1998 | Mitsuo |
| 5,764,639 A | 6/1998 | Staples et al. |
| 5,767,788 A | 6/1998 | Ness |
| 5,768,350 A | 6/1998 | Venkatakrishnan |
| 5,790,640 A | 8/1998 | Tassa et al. |
| 5,790,790 A | 8/1998 | Smith et al. |
| 5,793,762 A | 8/1998 | Penners et al. |
| 5,799,254 A | 8/1998 | Karmi et al. |
| 5,802,160 A | 9/1998 | Kugell et al. |
| 5,802,460 A | 9/1998 | Parvulescu et al. |
| 5,805,298 A | 9/1998 | Ho et al. |
| 5,815,562 A | 9/1998 | Iglehart et al. |
| 5,822,416 A | 10/1998 | Goodacre et al. |
| 5,825,759 A | 10/1998 | Liu |
| 5,826,196 A | 10/1998 | Cuthrell |
| 5,832,388 A | 11/1998 | Williams et al. |
| 5,832,390 A | 11/1998 | Irvin |
| 5,832,506 A | 11/1998 | Kuzma |
| 5,835,861 A | 11/1998 | Whiteside |
| 5,839,067 A | 11/1998 | Jonsson |
| 5,841,840 A | 11/1998 | Smith et al. |
| 5,841,843 A | 11/1998 | Bristow et al. |
| 5,844,979 A | 12/1998 | Raniere et al. |
| 5,861,883 A | 1/1999 | Cuomo et al. |
| 5,862,207 A | 1/1999 | Aoshima |
| 5,870,549 A | 2/1999 | Bobo, II |
| 5,870,677 A | 2/1999 | Takahashi et al. |
| 5,884,185 A | 3/1999 | Kim |
| 5,889,845 A | 3/1999 | Staples et al. |
| 5,890,064 A | 3/1999 | Widergen et al. |
| 5,901,359 A | 5/1999 | Malmstrom |
| 5,901,362 A | 5/1999 | Cheung et al. |
| 5,907,598 A | 5/1999 | Mandalia et al. |
| 5,909,650 A | 6/1999 | Jonsson |
| 5,912,918 A | 6/1999 | Bauchot et al. |
| 5,913,166 A | 6/1999 | Buttitta et al. |
| 5,913,176 A | 6/1999 | Barabash |
| 5,918,181 A | 6/1999 | Foster et al. |
| 5,920,815 A | 7/1999 | Akhavan |
| 5,920,863 A | 7/1999 | McKeehan et al. |
| 5,924,044 A | 7/1999 | Vannatta et al. |
| 5,926,760 A | 7/1999 | Khan et al. |
| 5,940,752 A | 8/1999 | Henrick |
| 5,940,770 A | 8/1999 | Kuki |
| 5,943,414 A | 8/1999 | McIntee et al. |
| 5,943,611 A | 8/1999 | Molne |
| 5,953,392 A | 9/1999 | Rhie et al. |
| 5,956,331 A | 9/1999 | Rautiola et al. |
| 5,956,652 A | 9/1999 | Eriksson |
| 5,960,363 A | 9/1999 | Mizikovsky et al. |
| 5,966,660 A | 10/1999 | Jonsson |
| 5,966,667 A | 10/1999 | Halloran et al. |
| 5,974,312 A | 10/1999 | Hayes, Jr. et al. |
| 5,978,672 A | 11/1999 | Hartmaier et al. |
| 5,983,098 A | 11/1999 | Gerszberg et al. |
| 5,983,282 A | 11/1999 | Yucebay |
| 5,987,499 A | 11/1999 | Morris et al. |
| 5,991,637 A | 11/1999 | Mack, II et al. |
| 5,995,843 A | 11/1999 | Sjodin et al. |
| 6,009,088 A | 12/1999 | Taguchi et al. |
| 6,009,323 A | 12/1999 | Heffield et al. |
| 6,011,975 A | 1/2000 | Emery et al. |
| 6,014,377 A | 1/2000 | Gillespie |
| 6,018,665 A | 1/2000 | Chavez, Jr. et al. |
| 6,018,666 A | 1/2000 | Chavez, Jr. |
| 6,021,138 A | 2/2000 | Lee |
| 6,021,335 A | 2/2000 | Zicker |
| 6,023,241 A | 2/2000 | Clapper |

| | | | | | | |
|---|---|---|---|---|---|---|
| 6,028,764 A | 2/2000 | Richardson et al. | | 6,137,525 A | 10/2000 | Lee et al. |
| 6,035,193 A | 3/2000 | Buhrmann et al. | | 6,169,911 B1 | 1/2001 | Wagner et al. |
| 6,041,045 A | 3/2000 | Alterman et al. | | 6,175,731 B1 | 1/2001 | Ohsuge |
| 6,047,198 A | 4/2000 | Sudo | | 6,178,331 B1 | 1/2001 | Holmes et al. |
| 6,052,573 A | 4/2000 | Ohmori et al. | | 6,181,952 B1 | 1/2001 | Murata |
| 6,052,579 A | 4/2000 | McC Estabrook | | 6,185,435 B1 | 2/2001 | Imura |
| 6,052,581 A | 4/2000 | O'Connell et al. | | 6,192,259 B1 | 2/2001 | Hayashi |
| 6,069,588 A | 5/2000 | O'Neill, Jr. | | 6,324,410 B1 | 11/2001 | Giacopelli et al. |
| 6,073,029 A | 6/2000 | Smith et al. | | 6,381,323 B1 | 4/2002 | Schwab et al. |
| 6,073,033 A | 6/2000 | Campo | | 6,405,041 B1 | 6/2002 | Mukerjee et al. |
| 6,085,112 A | 7/2000 | Kleinschmidt et al. | | 6,694,004 B1 | 2/2004 | Knoerle et al. |
| 6,088,431 A | 7/2000 | LaDue | | 7,162,020 B1 * | 1/2007 | Forte .................... 379/201.01 |
| 6,088,596 A | 7/2000 | Kawakami et al. | | | | |
| 6,094,478 A | 7/2000 | Shepherd et al. | | FOREIGN PATENT DOCUMENTS | | |
| 6,115,616 A | 9/2000 | Halperin et al. | | | | |
| 6,122,502 A | 9/2000 | Grundvig et al. | | WO | WO97/10668 | 3/1997 |
| 6,122,509 A | 9/2000 | Nguyen | | | | |
| 6,125,287 A | 9/2000 | Cushman et al. | | * cited by examiner | | |

METHOD AND APPARATUS FOR SELECTIVELY ESTABLISHING COMMUNICATION WITH ONE OF PLURAL DEVICES ASSOCIATED WITH A SINGLE TELEPHONE NUMBER

This application is a continuation of application Ser. No. 09/593,541, filed on Jun. 14, 2000 now U.S. Pat. No. 7,162,020, which claims priority from provisional application Ser. Nos. 60/139,498, filed Jun. 14, 1999, and 60/185,070, filed Feb. 25, 2000, which are hereby incorporated by reference in their entireties.

BACKGROUND

It has become relatively common for individuals to possess a number of different devices through which they communicate. For example, a person may have a home telephone, a wireless telephone, a pager and an office telephone. As the population becomes increasingly mobile, making contact with a person through one of these communication devices has become more difficult.

Call forwarding is one method of addressing this problem. Certain telephone systems allow users to enter another number to which a call is forwarded if not answered by a specified number of rings. This should allow an individual with multiple telephone devices to forward the call to such devices until the telephone at which the individual is located finally rings. However, if several telephones are involved, this approach becomes complicated. Moreover, it requires the calling party to remain on the line for a significant period of time if the call is to be forwarded multiple times. Furthermore, it is necessary that call forwarding capabilities exist on each of the individual's telephones. In addition, this approach requires that all telephones involved be reprogrammed each time an individual desires to initiate call forwarding. A significant drawback to this forwarding strategy is that, in each leg of the forwarded call, the calling party is terminated on the last device or network in the chain. It follows that the final number in the forwarding scheme is responsible for all available enhanced services or voice mail available to the caller. Accordingly, although a call may have been initially placed to an office telephone equipped with voice mail and/or operator assist, all such enhanced services of the corporate network are lost once the call is forwarded off the corporate PBX (e.g., to the user's wireless telephone).

Travel can also exacerbate the difficulty of establishing communication with an individual having access to multiple telephone devices. Upon checking into a hotel, the telephone in a traveler's hotel room becomes available as yet another potential means of contact. Unfortunately, this forces a calling party to decide whether to attempt to contact the traveler through his or her room telephone or other telephone device (e.g., wireless telephone or pager). If the traveler does not answer the called telephone, the calling party then must decide whether to leave a message (unaware of when, or if, the message will be retrieved) or instead attempt to reach the traveler via his or her other telephone. Likewise, if the traveler is expecting an important call but is unsure whether it will be placed to his room telephone or wireless telephone, the traveler may feel compelled to remain within his room until the call has been received. In addition, if the traveler's wireless telephone does not support certain types of long distance calls (e.g., to various foreign countries), the traveler may be able to place certain types of calls only from his or her hotel room.

The office telephone is the primary point of contact of most business people. Typically, corporations invest significantly in their office telephone infrastructure, which often includes voice mail, paging and unified messaging systems. In addition, most corporations have negotiated contracts with their telephone carriers (e.g., local and long distance carriers) to ensure they obtain the lowest possible rates for calls placed via their corporate network. However, because the corporate workforce is becoming increasingly mobile, more business people are using wireless telephones to conduct their business when they are out of the office. This has resulted in corporations spending a larger portion of their telecommunications budget on wireless communications, with far less favorable negotiated rates than the rates of their corporate network. In addition, wireless communication systems often lack the enhanced conveniences (e.g., inter-office voice mail, direct extension dialing, etc.) that corporate users have come to expect in the office environment.

A solution to the aforementioned problems would be to allow wireless telephony devices (e.g., wireless telephones or pagers) to access an office telephone system as though they were desktop telephones connected to the company's PBX. It is desirable to incorporate wireless devices into the PBX network so that users may place and receive telephone calls using the office PBX telephone system even though they are at a remote location (e.g., out of the office). This would allow the enhanced conveniences of today's PBX networks (e.g., interoffice voice mail, direct extension dialing, etc.) to be available on wireless devices—something which is desperately needed in today's society.

There have been recent attempts to incorporate wireless telephones into PBX networks. One system provided by Ericsson, requires the creation of a mini-cellular network within the confines of the enterprise. A cellular switching unit, unique wireless telephones and an auxiliary server are required to route inbound telephone calls to a wireless handset serving as a remote office telephone.

An in-building wireless system has been proposed by Nortel Networks. This system requires the wiring of pico-cells throughout the enterprise's building. The system routes inbound telephone calls to specialized wireless telephones serving as additional office PBX telephones. The wireless telephones cannot be used as conventional standard wireless telephones until they leave the premises.

These systems allow inbound calls to be routed to an office telephone and a wireless telephone, but they are not without their shortcomings. For example, each system requires specialized cellular equipment and wireless handsets. Moreover, the systems only use the wireless telephones for inbound telephone calls. In addition, these systems cannot use the wireless telephone as a conventional wireless telephone (i.e., not part of the enterprise's PBX network) within the building.

SUMMARY

A system for (and a method of) selectively establishing communication with one of plural devices associated with a single telephone number is provided. In a preferred embodiment, the system includes a wireless connect unit connected between an enterprise private branch exchange (PBX) network and a public switched telephone network. The wireless connect unit preferably serves as a gateway between the PBX and one or more remote communication devices. The remote devices can be used as standard PBX office telephones for both inbound and outbound telephone calls. Thus, features of the PBX network (e.g., voice mail, direct extension dialing, corporate calling plan, etc.) are available to the remote device even though they are not physically connected to the PBX. When the system receives an incoming call, it can route the call to an office telephone and one or more of the remote devices simultaneously or as desired by the user.

DETAILED DESCRIPTION OF PREFERRED EMBODIMENTS

Preferred embodiments and applications of the invention will now be described. Other embodiments may be realized and structural or logical changes may be made to the disclosed embodiments without departing from the spirit or scope of the invention. Although the preferred embodiments disclosed herein have been particularly described as applied to a business or office environment, it should be readily apparent that the invention may be embodied for any use or application having the same or similar problems.

The invention is more fully understood with reference to the preferred embodiments depicted in FIGS. 1-5. A first exemplary embodiment of the invention is discussed and illustrated with reference to its implementation within an office building or other enterprise establishment. In an office, for example, personnel are assigned to offices (or cubicles) with each office having an associated telephone. The office telephones are typically connected to a PBX, exchange, or other call processing infrastructure. The PBX allows each office telephone to have its own telephone extension and a direct inward dial (DID) telephone number. As known in the art, a telephone extension is typically a three or four digit telephone number where station-to-station (i.e., office-to-office) calls can be placed by dialing the three or four digit extension. This is commonly referred to as direct extension dialing. As also known in the art, a DID telephone number allows external calls (i.e., calls initiated outside of the office PBX) to be placed directly to the office telephone.

The invention is not to be limited to any particular environment. The invention may be implemented, for example, in a hotel, boarding house, dormitory, apartment, or other commercial or residential establishment, where individuals are assigned to a unique extension or DID telephone number. The term "office" as used herein encompasses a singular room or space within a business or other enterprise, or a hotel room or similar facility. The term "user" as used herein encompasses office personnel, hotel guests or other individuals associated with a telephone extension and DID telephone number.

Figure 1:
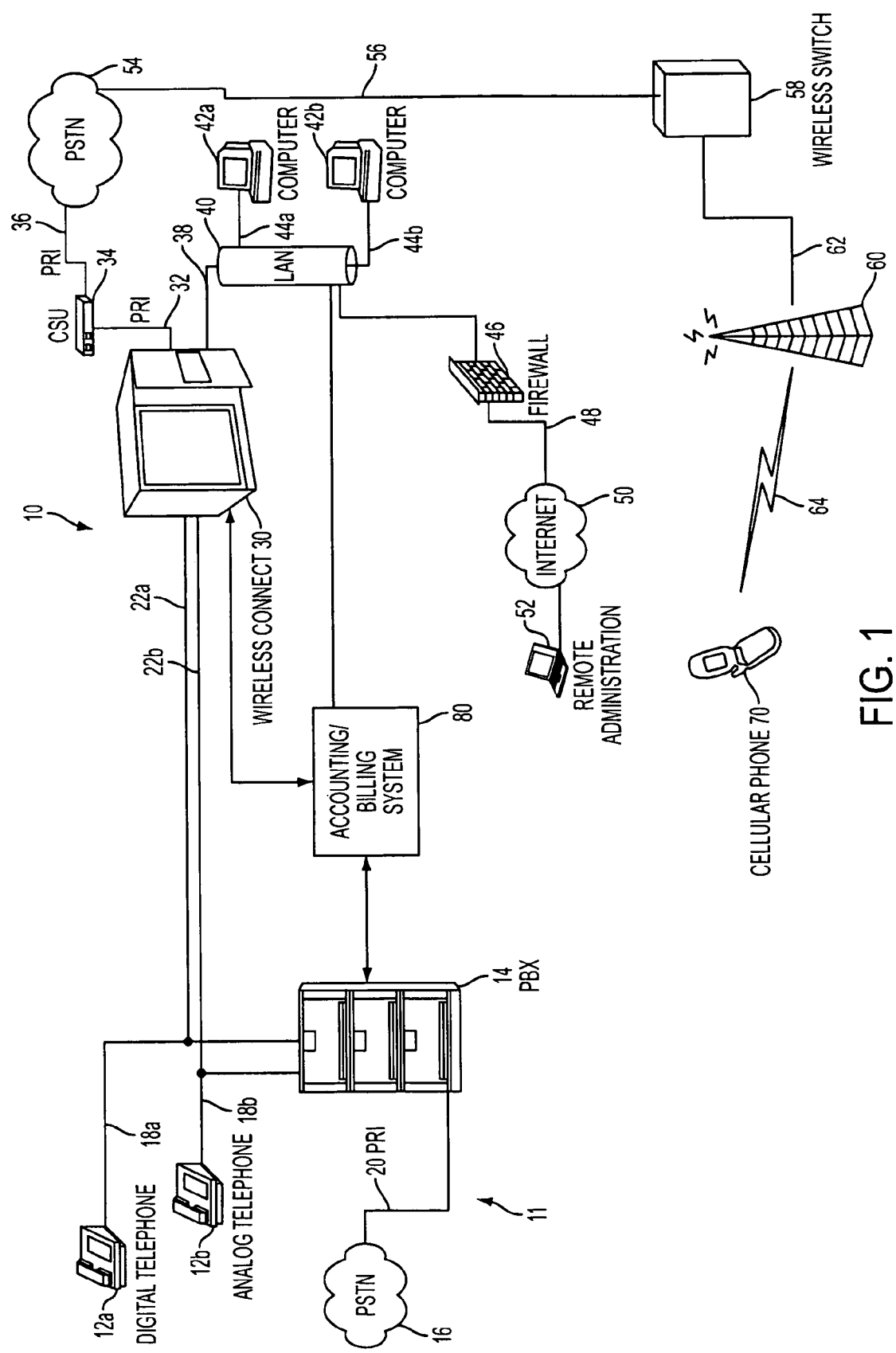
FIG. 1 illustrates an exemplary telecommunication system constructed in accordance with an embodiment of the invention.

FIG. 1 illustrates an exemplary telecommunication system 10 constructed in accordance with an embodiment of the invention. As will be discussed below, the system 10 provides for a full integration of remote telephony devices, such as a wireless telephone 70, into an office or hotel PBX or other communications network. In doing so, the system 10 can selectively establish communications with one of a plurality of telephony devices associated with a particular telephone extension or DID telephone number. Moreover, the system 10 will allow remote devices such as the wireless telephone 70 to perform as a fully functional standard office telephone 12*a*, 12*b* for both inbound and outbound communications. That is, a remote device will be able to use features of the office network (e.g., direct extension dialing, corporate dialing plan, etc.) even though the device is not within the confines of the office or not directly connected to the office PBX. The system also allows the wireless telephone 70 to operate as an independent wireless telephone if so desired. That is, the wireless telephone 70 may receive calls placed to its (non-office) DID telephone number even though the system 10 routes PBX calls to the telephone 70.

The system 10 as particularly illustrated herein includes a conventional office PBX network 11. The PBX network 11 may include a plurality of standard telephones 12*a*, 12*b* respectively connected to a conventional PBX 14 via communication lines 18*a*, 18*b*. The PBX 14, which may be any commercially available one such as a Meridian 1 PBX produced by Nortel Networks, is connected to a calling network such as a public switched telephone network (PSTN) 16 by a primary rate interface (PRI) connection 20 or other suitable communication line or medium. The standard telephones 12*a*, 12*b* can be any digital or analog telephone or other communication device known in the art. As illustrated in FIG. 1, the first telephone 12*a* is a digital telephone while the second telephone 12*b* is an analog telephone. For clarity purposes only, two telephones 12*a*, 12*b* are illustrated in FIG. 1, but it should be appreciated that any number or combination of telephones or other communication devices can be supported by the system 10. Moreover, although it is desirable to use digital telephones, the invention is not to be limited to the particular type of telephone used in the system 10.

The PBX 14 is coupled to a wireless connect unit (WC) 30. The WC 30 is connected to the PBX 14 and telephones 12*a*, 12*b* by suitable communication media 22*a*, 22*b*. The WC 30 is also connected to a PSTN 54 in this embodiment by a PRI connection or other suitable digital communication medium. The illustrated PRI connection between the WC 30 and the PSTN 54 includes a first PRI connection 32, a channel service unit (CSU) 34, and a second PRI connection 36. As known in the art, a CSU is a mechanism for connecting a computer (or other device) to a digital medium that allows a customer to utilize their own equipment to retime and regenerate incoming signals. It should be appreciated that the illustrated connection between the WC 30 and the PSTN 54 is utilizing CSU 34 and PRIs 32, 36, which is one of many suitable connections. Accordingly, the invention should not be limited to the illustrated connection. The WC 30 is one of the mechanisms that allows the integration of remote devices (e.g., wireless telephone 70) into the PBX network 11 and its operation will be described below in more detail.

The WC 30 is preferably connected to a local area network (LAN) 40 by an appropriate communication medium 38. Although a LAN 40 is illustrated, it should be appreciated that any other network could be used. A plurality of computers (e.g., 42*a*, 42*b*) may be respectively connected to the LAN 40 by any appropriate communication lines 44*a*, 44*b*. The computers 42*a*, 42*b* can be used by network administrators or others to maintain WC 30 and other portions of the system 10. The LAN 40 may also be connected to the Internet 50 by a suitable communication medium 48. A firewall 46 may be used for security purposes. In a preferred embodiment, Internet 50 can be used to allow a remote administration device 52 (e.g., a personal computer) to perform remote administration of WC 30 by office personnel or other authorized users of the system 10. Remote administration will allow office personnel to set user preferences for particular telephone extensions. Thus, each office telephone extension and associated remote device is individually configurable.

PSTN 54 is connected in this embodiment to a commercial wireless carrier (or other carrier not co-located with the system 10) by a wireless switch 58 or other wireless carrier equipment by an appropriate communication medium 56. The wireless switch 58 is connected to at least one antenna 60 (by an appropriate communication medium 62) for transmitting signals 64 to a wireless device, such as the wireless telephone 70. The wireless device could also be a pager, personal digital assistant (PDA), landline telephone, facsimile machine or other wired/wireless communication device. It may desirable for the wireless device to be capable of handling both (or either) digital and analog communication signals. It should be noted that any type of wireless communication protocol (or a combination of different protocols), such as TDMA, CDMA, GSM, AMPS, MSR, iDEN, WAP, etc., could be used.

It should be appreciated that the WC 30 is connected to a wireless carrier through a PSTN 54 and not by unique hardware or an in-office cellular network. As a result, WC 30 only has to interface with conventional components, such as the PBX 14 and PSTN 54. Thus, the system is substantially technology independent. Moreover, special wireless devices are not required, which allows the remote device to function in its conventional manner (e.g., as a separate wireless telephone) and as part of the PBX network 11 (if so desired).

The WC 30 and the PBX 14 may also be connected to an accounting/billing system 80. The billing system 80 may also be connected to the LAN 40 so that system administrators may access the contents of the billing system 80. By incorporating a billing system 80 into the system 10, it is possible to obtain immediate billing information for calls placed to/from the wireless telephone 70 or other remote device. This immediate billing feature is not present in other PBX or enterprise networks and is particularly useful for corporate environments such as law firms and government agencies, and hotel environments, where up to date billing information is essential.

Figure 2:
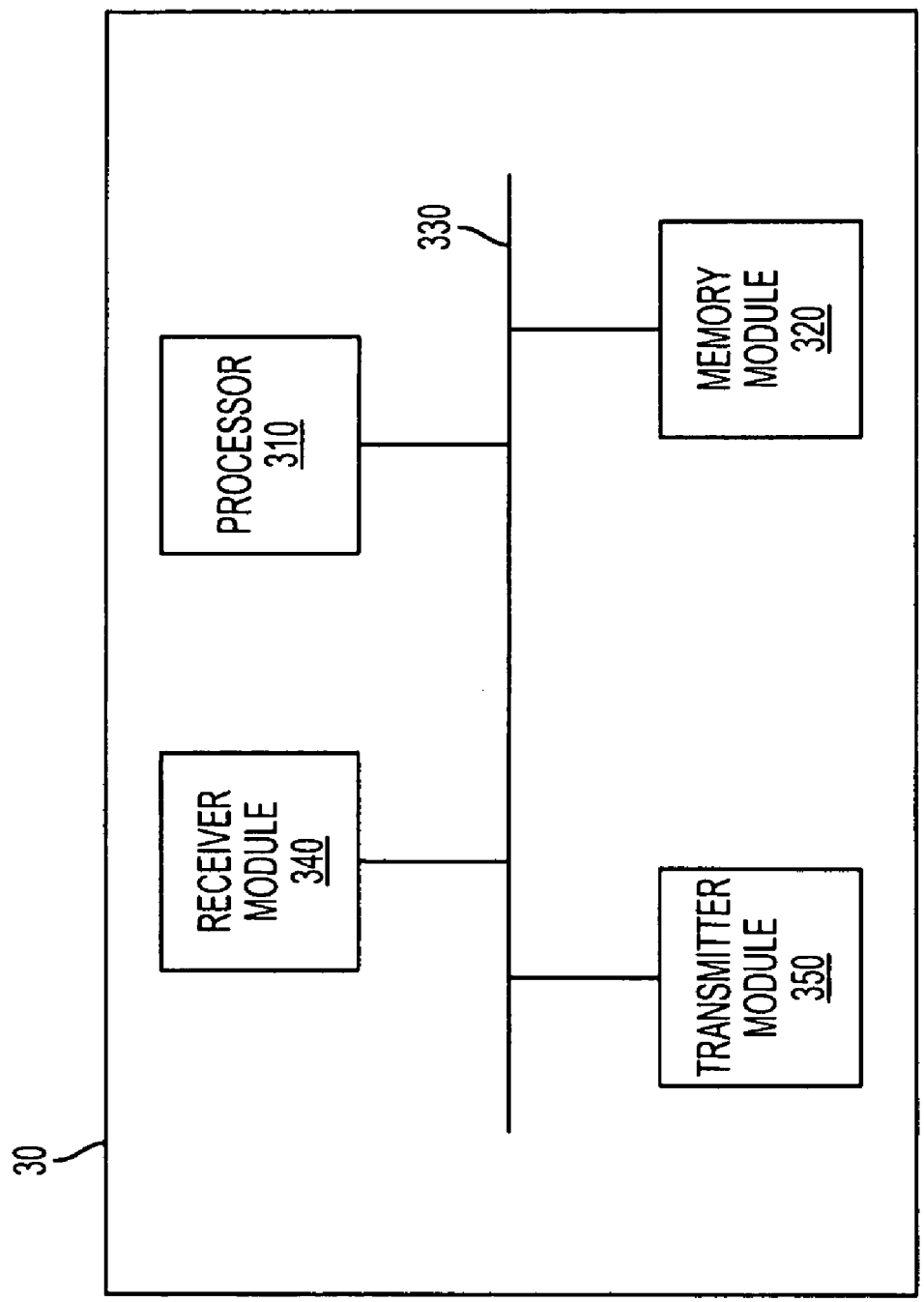
FIG. 2 illustrates a wireless connect unit in accordance with an embodiment of the invention.

As noted above, the WC 30 allows for the full integration of remote devices into the PBX network 11. In a preferred embodiment, WC 30 is a processor-based stand-alone unit capable of handling communications directed to the PBX network 11. In a preferred embodiment, WC 30 is composed of one or more processors generically represented by processor module 310 executing one or more computer programs stored in one or more memory units generically represented by memory module 320, which is coupled to processor module 310 via bus 330, as shown in FIG. 2. Memory module 320 also contains one or more databases and other processing memory used during the overall operation of system 10, as will be described below. Receiving and transmitting modules 340, 350, respectively, which are coupled to processor module 310 and memory module 320 via bus 330, are employed to receive and transmit information to the PBX and PSTN during call processing, as well as receiving and transmitting other information such as administrative information.

The modules (310, 320, 330, 340, 350) making up WC 30 may be implemented using any known hardware or software devices. For example, in one embodiment, workload performed by receiving and transmitting modules 340, 350, as well as some of the processing functions of processor module 310 of WC 30 are implemented using one or more conventional processor-based programmable telephony interface circuit cards used to interface WC 30 with PBX 14 and the PSTN. They are programmed to perform the conventional telephony services required to place and receive calls, as well as programmed to perform the unique call processing functions described below.

The WC 30 preferably contains a database of office extension numbers (also referred to herein as PBX extensions) and DID telephone numbers associated with each existing PBX extension. The database will be stored on a computer readable storage medium, which may be part of (e.g., in memory module 320) or connected to the WC 30. The database may also contain a wireless connect/PBX extension (hereinafter referred to as a "WC-PBX extension") and one or more remote device telephone numbers associated with each PBX extension. In this embodiment, software running on the telephony cards interfaces with the databases to perform the various call processing functions discussed below.

Figure 4:
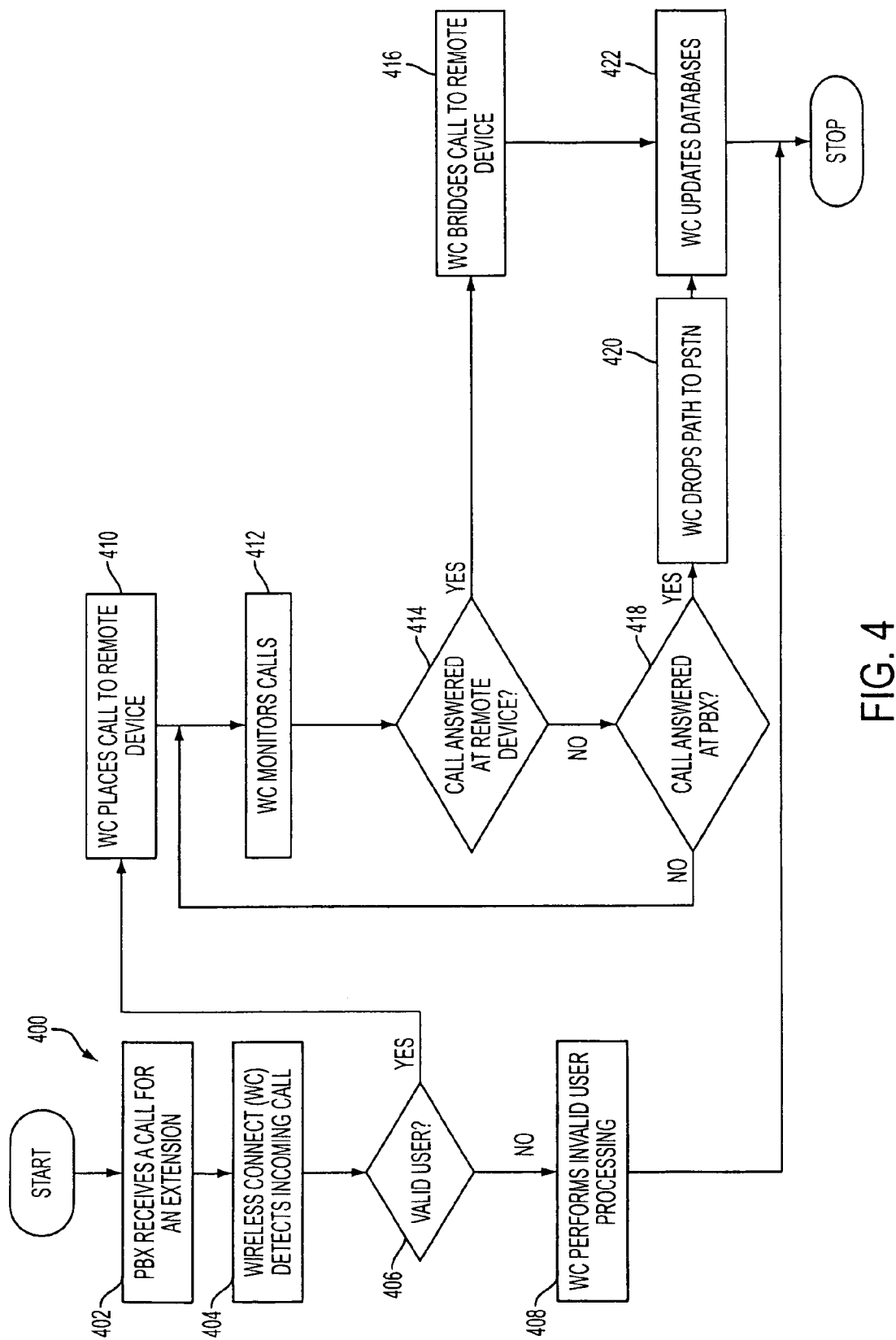
FIG. 4 illustrates in flowchart form exemplary inbound call processing flow in accordance with an embodiment of the invention.
Figure 5:
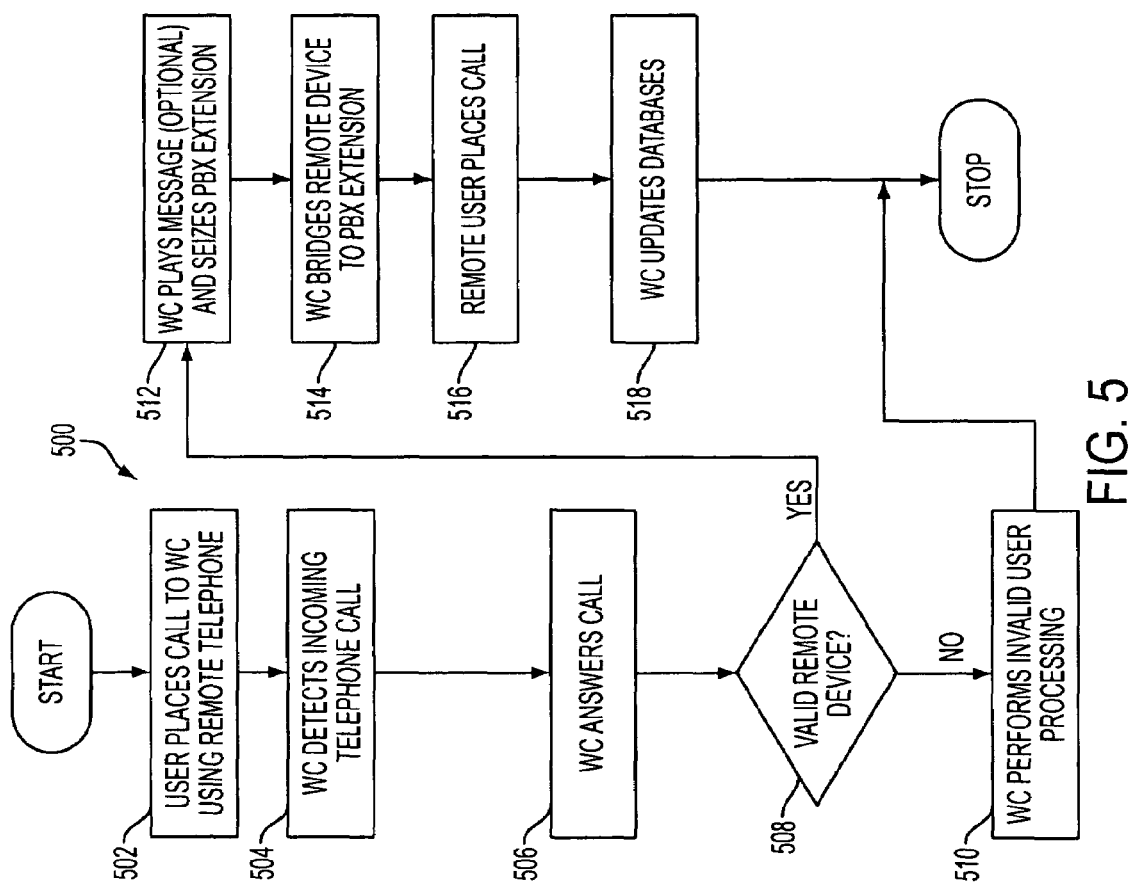
FIG. 5 illustrates in flowchart form exemplary remote outbound call processing flow in accordance with an embodiment of the invention.

In accordance with a preferred embodiment of the invention, processor module 310 executes one or more programs stored in memory module 320 to process calls received through PBX 14 or PSTN. FIGS. 4 and 5 illustrate some of the basic call processing events which WC 30 may be programmed to handle in accordance with exemplary embodiments of the invention.

Figure 3:
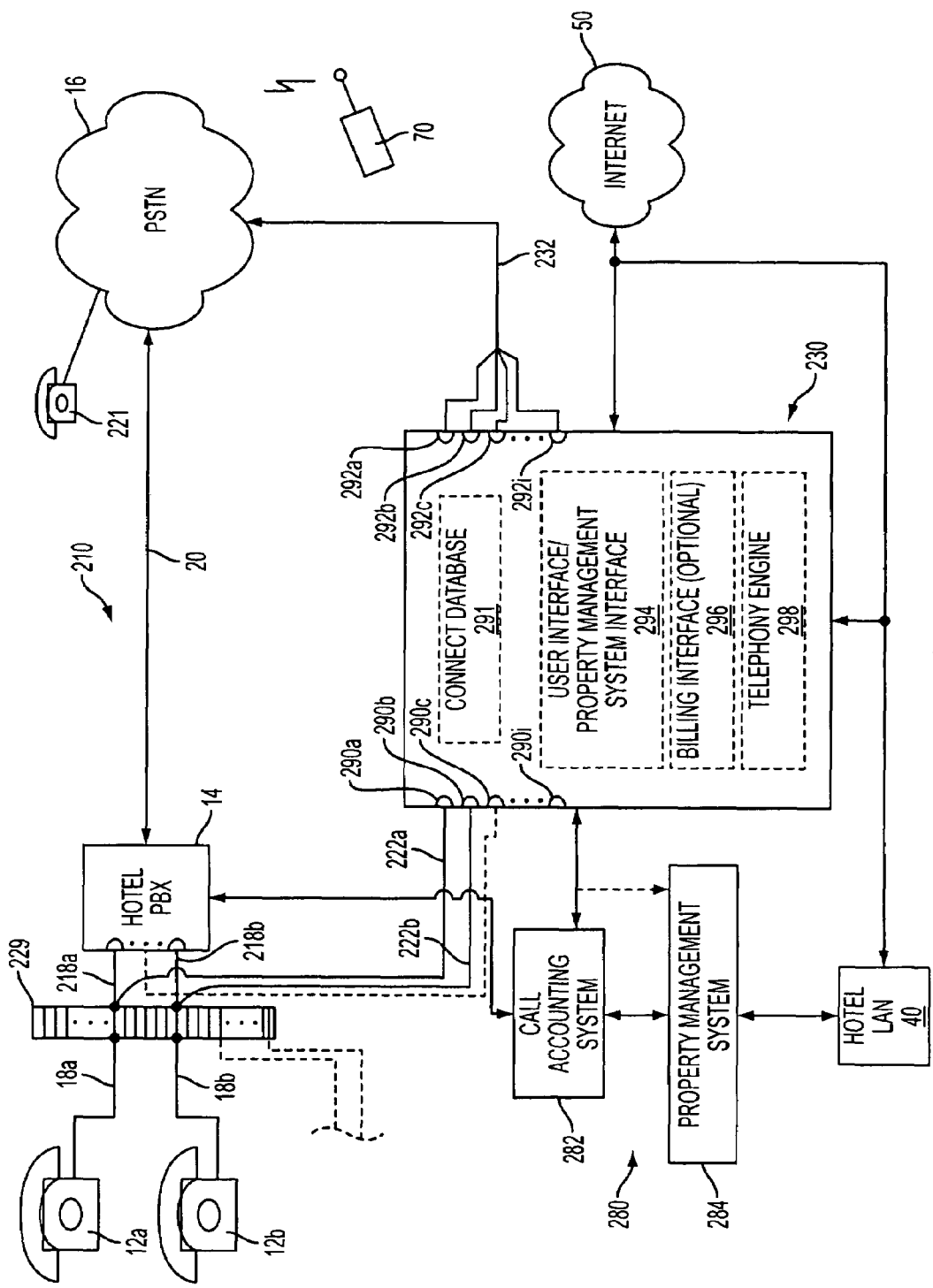
FIG. 3 illustrates another exemplary telecommunication system constructed in accordance with an embodiment of the invention.

FIG. 3 illustrates a specific example of a telecommunications system 210 constructed in accordance with an embodiment of the invention. The reference numerals from FIG. 1 are used in FIG. 3 for components that are the same between systems 10 and 210. In this example, the system 210 is used in a hotel environment, but as noted above, it should be apparent that the invention can be used in any environment.

In the exemplary system 210, an accounting/billing system 280 comprises at least a call accounting system 282 and/or a property management system (PMS) 284. These systems 282, 284 are typically provided by the hotel and may be accessed and updated via the hotel LAN 40. As noted above, the accounting/billing system 280 allows the system to obtain, display, printout, etc. immediate billing information for calls placed to/from the wireless telephone 70 or other remote device.

In the exemplary system 210, a cross connect panel 229 connects the physical extensions 218a, 218b of the PBX 14 to the respective phones 12a, 12b. The WC 230 is connected to the PBX 14 and telephones 12a, 12b by tapping into the cross-connect panel 229 with communication lines 222a, 222b, respectively. In the illustrated embodiment, the connection to the panel 229 allows the WC 230 to detect an incoming telephone call to one of the telephones 12a, 12b. Once detected, the WC 230 determines which hotel guest the call is intended for. The WC 230 then dials at least one telephone number associated with the guest, which is typically the number for at least one remote device 70. If the guest answers the associated telephone 12a, the WC 30 immediately ceases the call to the remote telephone 70.

Alternatively, if the remote telephone 70 is answered, the WC 230 may connect the call to the remote telephone 70.

The WC 230 allows a guest to use the hotel PBX 14 from a remote location via the remote telephone 70. The WC 230 receives an incoming call from the remote telephone 70, determines the calling number (e.g., from automatic number identification (ANI) information presented to the system) and uses this information to identify the source of the call. The WC 230 verifies that the caller is properly checked into the hotel (i.e., authorized to use the system) by comparing the ANI information to a list of current users. Upon validation, the remote phone call is connected to the hotel guest's appropriate room extension as if the guest were using hotel telephones 12a, 12b.

In the exemplary embodiment of FIG. 3, the WC 230 includes a connect database 291, and preferably runs software including a telephony engine 298, a user interface and property management system (PMS) interface 294 (hereinafter the "user/PMS interface 294"), and optionally a billing interface 296. It should be appreciated that the user/PMS interface 294 could be separate interfaces (i.e., separate applications running on the WC 230), if so desired.

The connect database 291 includes a table that maps each line port 290a, 290b, 290c, . . . 290i of the WC 230 to a telephone 12a, 12b, etc. within one of the guest rooms of the hotel. The connect database 291 also maintains information concerning each of the guests staying at the hotel. For example, the database 291 may include records pertaining to the guest's name, a guest id, the guest's hotel room and telephone extension, the PBX port number associated with the room telephone extension, the telephone number of the guest's remote telephone or other communication device(s), and the date and time of the guest's check-in and scheduled check-out. As guests are checked into and out of the hotel, the user/PMS interface 294 modifies the contents of these records based upon information provided by hotel front desk or other service personnel.

The WC 230 may also contain additional databases. The databases contained within or connected to the WC 230 in this embodiment will be collectively referred to herein as the "database subsystem." The additional databases may include any known data compilation such as call activity information for logging failures within the system 210 or port activity. This information may include, among other things, port number, date and time of the failure/activity, whether the call was inbound or outbound, whether the remote telephone was answered too late, whether the call was unanswered or whether a prompt was unrecognized. The databases may also include call detail records, used to record successful connection activity. The information may include, for example, originating port, connection port, date and time of call initiation and termination, length of the call in hours, minutes or seconds, the guest ID of the user, telephone number dialed by the user/switch, whether the call was inbound or outbound, the ANI of the calling trunk, room number and telephone extension, and various billing information. The databases may also include a history file, system diagnostic information, and hotel specific information such as the name of the hotel, telephone and area code of the hotel, number of rooms, technical assistance information, hotel code number, telephone calling rate information (dollars per minute, etc.), billing information including the telephone number of the billing system's modem and other information required by the hotel or the WC 230.

The user/PMS interface 294, via the hotel LAN 40, provides an interface through which database information may be entered or accessed using a standard Internet browser software on any LAN-connected personal computer (PC) by authorized personnel. Additionally, the WC 230 may manage check-in and check-out activity with the user/PMS interface 294 that is connected directly to the hotel's PMS allowing a seamless check-in/out process for the hotel staff. The interface through the LAN allows hotel personnel and other authorized individuals to access the WC 230 databases for review, modification and printout purposes, as well as other desired purposes.

The user/PMS interface 294 allows the appropriate personnel to enter all of the information required by the WC 230 during the check-in and check-out procedures. Thus, the guest's name, room number, remote telephone number, check-in and check-out date/time and guest ID may be entered through the LAN 40. The check-in and check-out date/time entries define the period in which the user is authorized to use the system 210. The user/PMS interface 294 also allows the appropriate personnel to modify a guest's records if necessary; it also allows administration functions to be performed on the system as well as the creation and printing of any necessary system reports and the viewing/printing of guest activity and call information. Modifications to the PMS information may be required if a guest checks into, or out of, the hotel at a date/time different from a reservation date/time.

The user/PMS interface 294 advantageously allows the check-in/out of hotel guests in the system to be virtually seamless to the hotel staff by collecting all necessary data used by the hotel in performing standard hotel check-in/out services. Moreover, the user/PMS interface 294 allows the WC 230 and the system 210 to be seamlessly configured to accommodate the arrival of new guests and the departures of existing guests. The WC 230 can access call accounting information (e.g., via a direct connection to the call accounting system 282) and hotel PMS information and may use or update this information as required.

In accordance with a preferred embodiment of the invention, processor module 310 (via telephony engine 298) executes one or more programs stored in memory module 320 to process calls received at the PBX 14 or PSTN 16. FIGS. 4 and 5 illustrate some of the basic call processing events, which WC 30 and WC 230 are programmed to handle in accordance with preferred embodiments of the invention. Continuing with the current hotel environment example of the invention, and referring to FIGS. 3 and 4, the PBX 14 receives a call from the PSTN (e.g., from telephone 221), and rings the corresponding telephone 12 via its associated extension 218 (step 402). This call is detected by the WC 230 (step 404). In one embodiment of the invention, the call may be detected by detecting a ringing signal at one of the PBX extensions 218.

In the present example, the WC 230 includes a plurality of analog or digital line cards (not shown), each of which is coupled to one of the ports 290. In the case of a digital connection between the WC 230 and the PBX 14, the PBX 14 is programmed to out dial a digital trunk connected to the WC 230 (usually an ISDN PRI) simultaneously upon receiving an event to one of the ports 290. This enables the detection of a telephone call on the associated extension 218. The system is capable of determining which line port 291 has detected activity and the nature of the activity. Such activity may, for example, be an incoming call to guest room telephone 12, or an internal session-to-session call. When the method 400 is initially executed, it is associated with and connected to an appropriate line port 290.

When the WC 230 detects that the PBX 14 has received a call, at step 406 a check is made to determine if the called guest is registered at the hotel and therefore eligible to receive in-bound calls and place out-bound calls (i.e., whether the guest is a "valid user" of the system 210). Specifically, the system compares the check-in and check-out information stored for the applicable guest to the current date/time. If the verification is unsuccessful, invalid user processing is performed and a record is inserted into an activity table of the database subsystem (step 408). Invalid user processing may include any processing deemed appropriate by the hotel administrator. It should be noted that in another environment (e.g., enterprise office building), steps 406 and 408 may not be required if all office or room telephones are authorized to use the system 210.

If at step 406 it is determined that the guest is a valid user of the system 210, a call is placed to the guest's remote telephone (step 410). In the specific example illustrated in FIG. 3, a port 292 for communication with the guest's remote telephone would be reserved by the WC 230 prior to placing the call to the remote telephone. While dialing and waiting for connection confirmation, the system continues to monitor for a calling party disconnect or local termination of the call (step 412). If the calling party disconnects or other termination of the call is detected, the call processing (method 400) is stopped.

In the illustrated example of FIG. 3, if it is determined that the call is answered at the remote device 70, the WC 230 bridges the guest's extension 218 at the PBX 14 to the guest's remote telephone and the call begins (steps 414, 416). Once the call has ended, the system generates all relevant date, time and billing information for writing to the applicable date and time variables and updates any databases of the database subsystem (step 422). In addition, call data is formatted and written into a call detail record, or "CDR." If there was a call failure, the system may produce information relating to the reasons for failure. If the guest's remote telephone does not answer, the system may record the reasons for the non-answer (e.g., no answer, call not accepted, call answered late). This information may then be stored within the activity table for subsequent statistical analysis.

If the call is answered at the PBX 14, by either the hotel telephone 12 or the hotel voice mail, the WC 30 drops the call to the remote device (steps 418, 420) and updates the databases accordingly (step 422).

In a preferred embodiment, once the call is connected to the remote device 70, a variety of message prompts such as "press 1 to connect call" may be provided to the remote telephone. Since the calling party had originally placed the call to the guest's room telephone 12, these messages provide the guest with a number of different options such as the opportunity to either accept or decline the call (e.g., the guest may prefer that the caller leave a voice mail message at the hotel). If the guest presses "1" or otherwise accepts the call, the call is bridged by the WC 230 from the guest's extension 218 at the PBX 14 to the guest's remote telephone. If the guest does not accept the call or no response is provided, the call to the remote telephone is terminated, the originating caller is routed according to the default settings of the PBX 14, and the appropriate information entered into the connect database. If the guest accepts the call, but the calling party has previously terminated the call or begun to leave a voice mail message at the guest's room telephone 12, the system may play a message such as "the calling party has terminated the telephone call . . . " for the remote telephone and the call is disconnected.

In this illustrated embodiment, the message prompt function ensures that the call is actually answered by the guest and not by another party (e.g., a service of the wireless carrier, wrong number, etc.). Today, wireless carriers may answer a call if there is a bad connection, the wireless channels are overloaded or for other reasons (such as initiating a wireless answering service). This embodiment overcomes the deficiencies of prior art communication systems by incorporating remote devices into a PBX network.

FIG. 5 illustrates in flowchart form exemplary remote call processing 500 performed by a preferred embodiment of the invention as it applies to a hotel environment (illustrated in FIG. 3). The method 500 begins when a remote user places a call to the WC 230 (step 502). At step 504, the WC 230 detects the call (via the PSTN). After the call is detected, it is answered (step 506), and a check is made to verify that the remote telephone is properly authorized to use the system (step 508). As part of the verification procedure, the system may verify that the ANI (i.e., caller ID) or DNIS (i.e., number dialed)—depending on the configuration selected—from the guest's remote telephone 70 matches that currently registered with the system prior to allowing the WC 230 to effect bridging to the PBX. If the remote calling telephone 70 is not validated at step 508, invalid user processing is performed such e.g., playing a "not recognized" message and providing the caller with the option of being connected to the operator of the PBX 14 (step 510). This enables guests who may have been improperly registered to make emergency calls and/or notify the hotel of the improper registration.

In a preferred embodiment, if it is determined that the remote telephone 70 has been properly registered (at step 508), the system plays an optional introduction for the remote telephone 70 (step 512). At this point, the system seizes the room extension 218 associated with the calling remote telephone. The WC 230 bridges the call to the remote telephone 70 via the PBX extension 218 (step 514). For example, if a guest assigned to room 202 has registered his or her cellular telephone with the hotel, then in response to an incoming call from this registered cellular telephone, the system seizes the room extension 218 associated with room 202 and bridges it to the incoming call.

Once the guest has been bridged to its applicable room extension 218, the guest's remote telephone 70 will receive the PBX dial tone. This occurs even if the guest's remote telephone 70 is a cellular telephone, which during normal operation would not be provided with a dial tone. At step 516, the guest is able to place a call (e.g., outbound, station-to-station, special services, front desk, etc.) through the PBX 14 as if the guest were utilizing the telephone 12 in its hotel room. Upon disconnection of the call, all relevant date and time information is generated and written into the appropriate databases and call detail record stored within the connect database (step 518).

As an alternate, a different extension of the PBX 14 is called rather than a guest's remote telephone in response to an inbound call directed to the guest's room telephone 12. Moreover, in other implementations a guest may be assigned to a "virtual" extension of the PBX 14 rather than to an extension 218 physically associated with an actual room telephone 12. In such an implementation the guest would have access to all of the functionality associated with the WC 30 or WC 230 described herein, but would effectively be associated with a "roaming" primary telephony device rather than a room telephone 12.

Numerous embodiments of the invention have application to corporate environments. In one exemplary implementation applicable to a corporate environment, for example, an "800" number is established to enable direct dial access to the WC from remote locations. Upon being connected, a remote system subscriber may be prompted for a "PIN" or other personal identifier and would be directly linked to the corporate PBX from a remote location. This configuration eliminates the need for corporate travelers to carry calling cards, and can result in significant savings on long distance toll charges since remote calls are placed through the corporate PBX at favorably negotiated rates. This configuration also allows users to place multiple calls on the corporate PBX based on a single call to the wireless connect via inexpensive "800" inbound trunking.

In another preferred embodiment, the system has the ability to set access rights defining what type of calls the user can place from the remote device (e.g., local, long distance, international, station-to-station, etc.). One way of implementing this feature is to use PRI connections between the PSTN 54 and the WC 30, the PBX 14 and the WC 30, and the PBX 14 and the PSTN 16, where users can be assigned into particular access groups by assigning each user to a particular channel or group of channels of the PRI. The user assignments can be stored in a database memory within memory module 320 of WC 30 for access during a validation or authentication process performed by processor module 310. In the alternative, the responsibility over the user assignments can be incorporated into PBX 14 or some other (on-site/remote) equipment.

As is known in the art, in North America and Japan, for example, each PRI contains 23 "B" channels that can be used for voice communications. Each B channel can be programmed with different calling capabilities by the PBX 14. That is, some channels can be programmed for all types of calls (e.g., international, long distance, local etc.), others for long distance and local calls, while others can be programmed solely for local or internal station-to-station calls. The channels can also be restricted to a limited number of authorized telephone numbers as well. The programming can be determined by the enterprise. Since the channels can be programmed with different calling capabilities, the enterprise can implement different access groups, with each group defining a user's remote device access.

This feature significantly limits the enterprise's remote device (e.g., wireless service) costs because user access to services can be substantially restricted. For example, the enterprise may want delivery personnel to have a wireless telephone for internal dialing purposes, but may be afraid of misuse by the personnel. Implementing the above embodiment, the enterprise can group all wireless telephones assigned to its delivery personnel to a channel(s) restricted solely to internal calls. Any grouping is possible. Priorities may also be assigned. A user assigned to group 1 (programmed for all calling capabilities) may be given priority to bump a user assigned to group 2 (having less calling capabilities) in the event that the channels assigned to group 1 are busy. Any grouping or priority scheme can be implemented by the enterprise and is application specific.

In a preferred embodiment, WC 30 and WC 230 are co-located with the enterprises' PBX 14, but may also be centrally located in a remote location or distributed among the many locations, or any combination of these arrangements.

While preferred embodiments have been specifically described and illustrated herein, it should be apparent that many modifications to the embodiments and implementations of the invention can be made without departing from the spirit or scope of the invention. For example, while the preferred embodiments illustrated herein have been limited to the processing of voice (packet or circuit switched) calls, it should be readily apparent that any form of call (e.g., audio, video, data) may be processed through WC 30 (or WC 230) to any communication device (e.g., cellular phone, pager, office/residential landline telephone, computer terminal, personal digital assistant (PDA), etc.). The individual method steps of the exemplary operational flows illustrated in FIGS. 4 and 5 may be interchanged in order, combined, replaced or even added to without departing from the scope of the invention. Any number of different operations not illustrated herein may be performed utilizing the invention.

In addition, while the illustrated embodiments have demonstrated implementations of the invention using PBX-based communication systems, it should be readily apparent that the WC module may be connected (directly, indirectly, co-located, or remotely) with any other network switching device or communication system used to process calls such as a central switching office, centrex system, or Internet server for telephone calls made over the public switched telephone network, private telephone networks, or even Internet Protocol (IP) telephony networks made over the Internet. The use of a commercial wireless carrier network (represented by wireless switch 58 and antenna 60) as described herein may be implemented using one or more commercial carriers using the same or different signaling protocols (e.g., Sprint PCS and Nextel, etc.) depending on the communication devices registered with the system.

It should be apparent that, while only PRI lines (e.g., between PBX 14 and WC 30/WC 230, between PBX 14 and PSTN 16) have been illustrated in discussing preferred embodiments of the invention, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be used in reducing the invention to practice. It should be noted that the WC 30/230 could trunk back to the PBX 14 instead of being directly connected to the PSTN 54.

The modules described herein such as the modules making up WC 30 (or WC 230), as well as WC 30 (or WC 230) and PBX 14 themselves, may be one or more hardware, software, or hybrid components residing in (or distributed among) one or more local or remote systems. It should be readily apparent that the modules may be combined (e.g., WC 30 and PBX 14) or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface devices utilized by in or in conjunction with WC 30 (or WC 230) may be any device used to input and/or output information. The interface devices may be implemented as a graphical user interface (GUI) containing a display or the like, or may be a link to other user input/output devices known in the art.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components.

What is claimed as new and desired to be protected by Letters Patent of the United States is:

1. An apparatus for establishing communication between a first telephone call placed to a landline telephone and a wireless device, the landline telephone being associated with a primary telephone number and a first network, the wireless device being associated with a second network, the system comprising:
 a computer readable storage medium, said storage medium storing a secondary telephone number associated with the primary telephone number and corresponding to the wireless device; and
 a telephony engine coupled to said computer readable storage medium and a first port adapted to be connected to a telephone extension associated with the primary telephone number, said engine adapted to retrieve the secondary telephone number from the storage medium upon detection of the first telephone call via the first port, said engine adapted to place a second telephone call to the secondary telephone number and to bridge the first telephone call to the wireless device when the wireless device answers the second telephone call before the landline telephone answers the first telephone call.

2. The apparatus of claim 1, wherein the first and second telephone calls occur substantially simultaneously with each other.

3. The apparatus of claim 1, wherein said engine is adapted to detect the first telephone call by detecting a ringing of the landline telephone at the extension.

4. The apparatus of claim 1, wherein the wireless device is a personal digital assistant.

5. The apparatus of claim 1, wherein the wireless device comprises a cellular telephone and said apparatus provides a message to the cellular telephone inquiring whether the first telephone call is to be accepted.

6. The apparatus of claim 1, wherein the first telephone network is a private branch exchange, the second telephone network is coupled to the system via a public switched telephone network, and said engine is adapted to bridge the first telephone call by connecting the first port to a second port connected to the public switched telephone network.

7. A system for establishing communication between a first telephone call placed to a telephone extension and a wireless device, the apparatus comprising:
 a database, said database storing connection information associating a primary telephone number and the telephone extension to the wireless device and a second telephone number associated with the wireless device; and
 a processor in communication with the database and being coupled to a first port adapted to be connected to the telephone extension associated with the primary telephone number, said processor adapted to detect the first telephone call via the first port, retrieve the secondary telephone number from the database, place a second telephone call to the secondary telephone number, and to bridge the first telephone call to the wireless device when the wireless device answers the second telephone call.

8. The system of claim 7, further comprising a property management system, wherein said processor further comprises a property management system interface for exchanging information between the property management system and said database.

9. The system of claim 8, wherein said connection information is retrieved from said property management system prior to being stored in said database.

10. The system of claim 8 further comprising an accounting system, wherein said processor further comprises a billing interface for exchanging information between the accounting system and said database.

11. The system of claim 10, wherein said processor obtains immediate billing information from the accounting system.

12. The system of claim 7, wherein the database comprises information regarding activity on the first port.

13. The system of claim 12, wherein the information regarding activity on the first port comprises one of call status, call initiation and call termination information.

14. An apparatus for providing communication between a first communication device having a first communication number and a first extension associated with a first communication network and a second communication device associated with a second communication network, the apparatus comprising:
 a connect database, said database storing connection information associating the first communication number and extension to the second communication device and a second communication number associated with the second communication device, the second communication device being a wireless device;
 a plurality of communication ports, a first port being connected to the extension and a second port being connected to the second communication network via a public switched telephone network; and
 a processor, said processor adapted to connect a first communication placed to the first communication device and detected via the first port to the second communication device via the second port based on the associated connection information from the database.

15. The apparatus of claim 14, wherein the first communication network is an enterprise private branch exchange and the second communication network is a wireless carrier network located remotely from the first communication network.

16. The apparatus of claim 15, wherein said processor is further adapted to provide the wireless device access to features of the first communication network so that the wireless device operates substantially identically as the first communication device.

17. The apparatus of claim 16, wherein said processor is adapted to provide a dial tone on the wireless device via the second port.

18. The apparatus of claim 14, wherein the second communication device is a personal digital assistant.

19. The apparatus of claim 14, wherein the first communication is detected by detecting a ringing of the first communication device via the first port.

* * * * *